(12) United States Patent
Wang et al.

(10) Patent No.: US 10,985,358 B2
(45) Date of Patent: Apr. 20, 2021

(54) DIRECT PLACEMENT BATTERY PACK MODULES

(71) Applicant: Apple Inc., Cupertino, CA (US)

(72) Inventors: Depeng Wang, Santa Clara, CA (US); Thai T. Ton, Campbell, CA (US); Nathan J. Bohney, Campbell, CA (US); George V. Anastas, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 15/981,420

(22) Filed: May 16, 2018

(65) Prior Publication Data

US 2019/0260007 A1    Aug. 22, 2019

Related U.S. Application Data (60) Provisional application No. 62/710,360, filed on Feb. 16, 2018.

(51) Int. Cl.
*H01M 2/26* (2006.01)
*H01M 10/42* (2006.01)

(52) U.S. Cl.
CPC .......... *H01M 2/26* (2013.01); *H01M 10/425* (2013.01); *H01M 2010/4271* (2013.01)

(58) Field of Classification Search
CPC ....... H01M 10/425; H01M 2010/4271; H01M 2/30; H01M 2/0212; H01M 2/22; H01M 2/20

See application file for complete search history.

(56) References Cited

U.S. PATENT DOCUMENTS

| 2006/0214632 A1* | 9/2006 | Lee ............... H01M 2/021 320/112 |
| 2011/0123836 A1* | 5/2011 | Jang ............. H01M 10/425 429/7 |
| 2015/0037619 A1 | 2/2015 | Ahn |
| 2016/0174378 A1* | 6/2016 | Johnson ......... H05K 1/148 361/760 |

FOREIGN PATENT DOCUMENTS

KR    20150121518 A    10/2015

OTHER PUBLICATIONS

"Examination Report," dated Jul. 27, 2020 in India Patent Application No. 201914002554. 5 pages (includes English translation).

* cited by examiner

*Primary Examiner* — Muhammad S Siddiquee
(74) *Attorney, Agent, or Firm* — Kilpatrick Townsend & Stockton LLP (57) ABSTRACT

Battery systems according to embodiments of the present technology may include a battery cell having an electrode tab extending from an edge of a first side of the battery cell. The battery system may also include a module electrically coupled with the battery cell. The module may include a mold defining a recess along a first side of the module. The module may also include a conductive tab extending from the first side of the module. The conductive tab may be coupled with the electrode tab. The electrode tab may be characterized by a curvature along a length of the electrode tab, and a distal end of the electrode tab may be positioned within the recess defined by the mold.

19 Claims, 5 Drawing Sheets

DIRECT PLACEMENT BATTERY PACK MODULES

CROSS-REFERENCES TO RELATED APPLICATIONS

This application claims priority to U.S. Provisional Application No. 62/710,360, filed Feb. 16, 2018, the disclosure of which is hereby incorporated by reference in its entirety for all purposes.

TECHNICAL FIELD

The present technology relates to battery systems. More specifically, the present technology relates to battery component configurations affording improved spacing.

BACKGROUND

Batteries are used in many devices. As devices in which batteries are housed reduce in size, the available space for battery cells and associated system materials may limit placement options.

SUMMARY

Battery systems according to embodiments of the present technology may include a battery cell having an electrode tab extending from an edge of a first side of the battery cell. The battery system may also include a module electrically coupled with the battery cell. The module may include a mold defining a recess along a first side of the module. The module may also include a conductive tab extending from the first side of the module. The conductive tab may be coupled with the electrode tab. The electrode tab may be characterized by a curvature along a length of the electrode tab, and a distal end of the electrode tab may be positioned within the recess defined by the mold.

In some embodiments, the module may also include a flexible coupling extending from a second side of the module adjacent to the first side of the module. The flexible coupling may curve vertically and extend back along the module to a lateral position along a length of the module. The flexible coupling may be communicatively coupled with the system board by a board-to-board connector. The battery cell may be seated on the system board, and a volume may be at least partially defined between the electrode tab and the system board. The module and flexible coupling may be maintained within the volume. The conductive tab may be characterized by a double bend that extends a distal portion of the conductive tab parallel with the distal end of the electrode tab. The battery cell may include a housing, and opposite sides of the battery cell adjacent the first side of the battery cell may be characterized by folded edges. The electrode tab may extend from the housing along the first side, and the electrode tab and housing may at least partially form a terrace on which a portion of the module resides along the first side of the battery cell. A sealant may be included about a portion of the electrode tab extending from the housing.

Some embodiments of the present technology may also encompass a battery system. The battery system may include a battery cell characterized by a height. The battery cell may include an electrode tab exiting from an edge of a first side of the battery cell, and the battery cell may form a terrace along the first side of the battery cell. The battery system may include a module electrically coupled with the battery cell. The module may include a circuit board including a conductive tab extending from a first side of the circuit board and a flexible coupling extending from a second side of the circuit board orthogonal to the first side of the circuit board. The conductive tab may be electrically coupled with the electrode tab. The module may also include a mold at least partially encapsulating the circuit board. The conductive tab may penetrate the mold, and the mold may be at least partially seated on the terrace. The flexible coupling may form a U-bend proximate the circuit board, and the flexible coupling may extend along the mold to a connector by which the battery system is configured to be connected with a system board. The module and flexible coupling may be maintained within a volume defined by the height of the battery cell.

In some embodiments, a portion of the mold may extend beyond the terrace. The portion of the mold extending beyond the terrace may be characterized by a height greater than a height of the mold seated on the terrace. The portion of the mold extending beyond the terrace may extend laterally about a portion of the electrode tab exiting from the edge of the first side of the battery cell. The conductive tab may extend from the mold vertically offset from the electrode tab. The conductive tab may be characterized by an L-bend extending towards the electrode tab at an angle less than or about 90°. The conductive tab may be coupled with the electrode tab distal to the L-bend, and the conductive tab may be further characterized by a U-bend distal to the L-bend. The mold may define a recess at a position through which the conductive tab penetrates the mold, and a distal end of the conductive tab and a distal end of the electrode tab may be positioned within the recess.

The electrode tab may be characterized by a first width, and the conductive tab may be characterized by a second width greater than the first width. The battery system may also include an insulative tape extending about the module from a first surface of the terrace opposite a second surface on which the module resides to a location on the battery cell along the height of the battery cell. The flexible coupling may include a first flexible coupling, and a distal end of the first flexible coupling may be electrically coupled with a second flexible coupling. The second flexible coupling may extend orthogonally to the first flexible coupling towards the battery cell. The second flexible coupling may form a U-bend proximate the battery cell and extending around the distal end of the first flexible coupling. The second flexible coupling may be electrically coupled with the connector at a distal end of the second flexible coupling. The second flexible coupling may be electrically coupled with the connector along a first surface of the second flexible coupling. The battery system may also include a suspension bracket coupled with the second flexible coupling along a second surface of the second flexible coupling opposite the first surface of the second flexible coupling.

Some embodiments of the present technology may also encompass a battery system.

The battery system may include a battery cell, and the battery cell may include an electrode tab extending from an edge of a first side of the battery cell. The battery cell may form a terrace along the first side of the battery cell. The terrace may include the electrode tab and a housing of the battery cell. The battery system may also include a module electrically coupled with the battery cell. The module may include a circuit board including components extending from a first surface of the circuit board. The circuit board may be at least partially seated on the terrace along a second surface of the circuit board opposite the first surface. The module may include a mold at least partially encapsulating the circuit board. The mold may define a recess along a first side of the module. The module may also include a conductive tab extending from the first side of the module. The conductive tab may be coupled with the electrode tab, and the electrode tab may be characterized by a curvature along a length of the electrode tab. A distal end of the electrode tab may be positioned within the recess defined by the mold.

Such technology may provide numerous benefits over conventional technology. For example, the present systems may provide a compact vertical positioning of battery system components. Additionally, the battery system components may be positioned to limit or prevent battery system components extending outside of a defined volume. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, are used in a host of different systems. In many devices, the battery cell may be designed with a balance of characteristics in mind. For example, including larger battery cells may provide increased usage between charges, however, the larger batteries may require larger housing, or increased space within the device. As device designs and configurations change, especially in efforts to reduce device sizes, the available space for additional battery system components may be constrained. These constraints may include restrictions in available volume as well as the geometry of such a volume. Conventional devices have often been restricted to larger form factors to accommodate both a sufficient battery cell as well as associated battery system components. The present technology may overcome these issues, however, by providing a configuration by which battery control system components may be confined to a vertical space conforming to the battery cell in one or more ways. After illustrating an exemplary cell that may be used in embodiments of the present technology, the present disclosure will describe battery system designs having a controlled form factor for use in a variety of devices in which battery cells may be used.

Although the remaining portions of the description will routinely reference lithium-ion batteries, it will be readily understood by the skilled artisan that the technology is not so limited. The present techniques may be employed with any number of battery or energy storage devices, including other rechargeable and primary battery types, as well as electrochemical capacitors. Moreover, the present technology may be applicable to batteries and energy storage devices used in any number of technologies that may include, without limitation, phones and mobile devices, watches, glasses, and other wearable technology including fitness devices, handheld electronic devices, laptops and other computers, as well as other devices that may benefit from the use of rechargeable battery technology.

Figure 1:
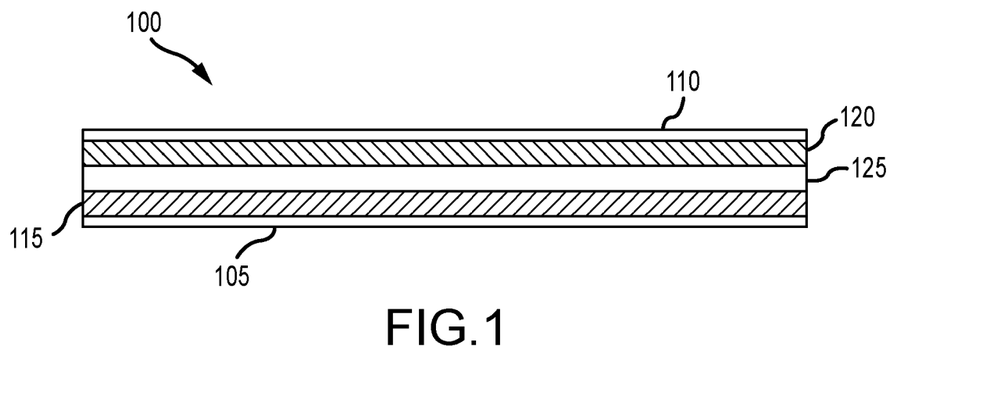
FIG. 1 shows a schematic cross-sectional view of a battery cell according to some embodiments of the present technology.

FIG. 1 depicts a schematic cross-sectional view of an energy storage device 100 according to embodiments of the present technology. Energy storage device 100 may be or include a battery cell, and may include a number of cells coupled together to form a battery structure. As would be readily understood, the layers are not shown at any particular scale, and are intended merely to show the possible layers of cell material of one or more cells that may be incorporated into the energy storage device 100. In some embodiments, as shown in FIG. 1, battery cell 100 includes a first current collector 105 and a second current collector 110. In embodiments one or both of the current collectors may include a metal or a non-metal material, such as a polymer or composite. The first current collector 105 and second current collector 110 may be different materials in embodiments. For example, in some embodiments the first current collector 105 may be a material selected based on the potential of an anode active material 115, such as copper, stainless steel, or any other suitable metal, as well as a non-metal material including a polymer. The second current collector 110 may be a material selected based on the potential of a cathode active material 120, such as aluminum, stainless steel, or other suitable metals, as well as a non-metal material including a polymer. In other words, the materials for the first and second current collectors can be selected based on electrochemical compatibility with the anode and cathode active materials used.

The first and second current collectors may be made of any material known in the art. For example, copper, aluminum, nickel, or stainless steel may be used, as well as composite materials having metallic aspects, and non-metallic materials including polymers. In some instances the metals or non-metals used in the first and second current collectors may be the same or different. The materials selected for the anode and cathode active materials may be any suitable battery materials operable in rechargeable as well as primary battery designs. For example, the anode active material 115 may be silicon, graphite, carbon, a tin alloy, lithium metal, a lithium-containing material, such as lithium titanium oxide (LTO), or other suitable materials that can form an anode in a battery cell. Additionally, for example, the cathode active material 120 may be a lithium-containing material. In some embodiments, the lithium-containing material may be a lithium metal oxide, such as lithium cobalt oxide, lithium manganese oxide, lithium nickel manganese cobalt oxide, lithium nickel cobalt aluminum oxide, or lithium titanate, while in other embodiments the lithium-containing material can be a lithium iron phosphate, or other suitable materials that can form a cathode in a battery cell.

The first and second current collectors as well as the active materials may have any suitable thickness. A separator 125 may be disposed between the electrodes, and may be a polymer film or a material that may allow lithium ions to pass through its structure while not otherwise conducting electricity. Active materials 115 and 120 may additionally include an amount of electrolyte in a completed cell configuration. The electrolyte may be a liquid including one or more salt compounds that have been dissolved in one or more solvents. The salt compounds may include lithium-containing salt compounds in embodiments, and may include one or more lithium salts including, for example, lithium compounds incorporating one or more halogen elements such as fluorine or chlorine, as well as other non-metal elements such as phosphorus, and semimetal elements including boron, for example.

In some embodiments, the salts may include any lithium-containing material that may be soluble in organic solvents. The solvents included with the lithium-containing salt may be organic solvents, and may include one or more carbonates. For example, the solvents may include one or more carbonates including propylene carbonate, ethylene carbonate, ethyl methyl carbonate, dimethyl carbonate, diethyl carbonate, and fluoroethylene carbonate. Combinations of solvents may be included, and may include for example, propylene carbonate and ethyl methyl carbonate as an exemplary combination. Any other solvent may be included that may enable dissolving the lithium-containing salt or salts as well as other electrolyte component, for example, or may provide useful ionic conductivities, such as greater than or about 5-10 mS/cm.

Although illustrated as single layers of electrode material, cell material 100 may be any number of layers. Although the cell may be composed of one layer each of anode and cathode material as sheets, the layers may also be formed into a jelly roll design, or folded design, prismatic design, or any form such that any number of layers may be included in cell material 100. For embodiments which include multiple layers, tab portions of each anode current collector may be coupled together, as may be tab portions of each cathode current collector. Once the cell has been formed, a pouch, housing, or enclosure may be formed about the cell to contain electrolyte and other materials within the cell structure, as will be described below. Terminals may extend from the pouch to allow electrical coupling of the cell for use in devices, including an anode and cathode terminal. The coupling may be directly connected with a load that may utilize the power, and in some embodiments the battery cell may be coupled with a control module that may monitor and control charging and discharging of the battery cell. FIG. 1 is included as an exemplary cell that may be incorporated in battery systems according to the present technology. It is to be understood, however, that any number of battery and battery cell designs and materials that may be characterized by a height and include charging and discharging capabilities similarly may be encompassed by the present technology.

Figure 2:
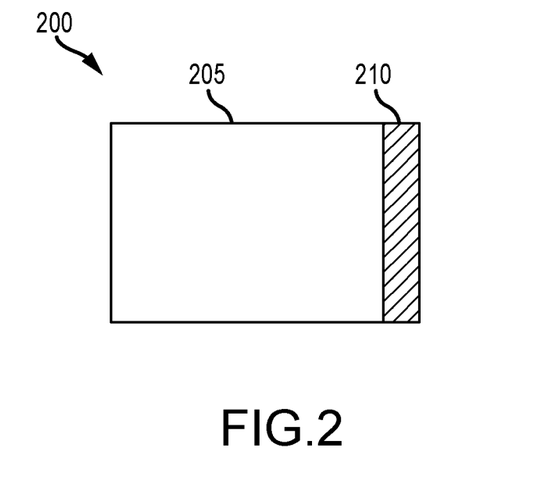
FIG. 2 shows a schematic plan view of a battery system according to some embodiments of the present technology.

FIG. 2 shows a schematic plan view of a battery system 200 according to some embodiments of the present technology. As illustrated, battery system 200 may include a battery cell 205, as well as a battery module 210. Battery module 210 may be electrically connected with battery 205 to provide a variety of functionality. For example, battery module 210 may monitor battery cell 205 during charging and discharging operations, and may ensure the battery cell is not overcharged or over-depleted during use. Additionally, battery module 210 may monitor overall health of the battery cell 205 to ensure proper functioning. Battery module 210 may couple with terminals of the battery, such as one or both of the positive and negative terminals, in order to provide this functionality.

Battery module 210 may also provide access to an additional electrical connector, such as a flexible coupling, that may allow device components to access the battery storage through the battery module 210. In this way, battery module 210 may provide a pass-through functionality for delivering power from battery cell 205. Consequently, battery module 210 may be under constant load from the battery cell. Battery cell 205 may include a battery cell, which may be similar to battery cell 100 described above, and may include a pouch or enclosure to protect the battery cell from exposure to the environment. The pouch may also operate to maintain electrolyte and other materials within the battery cell. To access the battery cell through this pouch, one or more terminals or leads may extend through the pouch. Some conventional designs may wrap the battery module 210 onto the terminals of battery cell 205, which may allow the provision of additional materials to protect terminals and conductive components from fluid contact. However, as device configurations continue to shrink, and manufacturing processes include many more small scale operations with smaller and/or thinner materials, these types of incorporations may become less feasible or prone to causing damage. The present technology allows for a direct placement of the battery module 210 onto terminals of the battery cell 205, which may improve device or component integrity during fabrication. After describing an exemplary battery system configuration according to the present technology, the disclosure will explain an exemplary direct placement process for a battery control module that may be performed according to the present technology.

Figure 3:
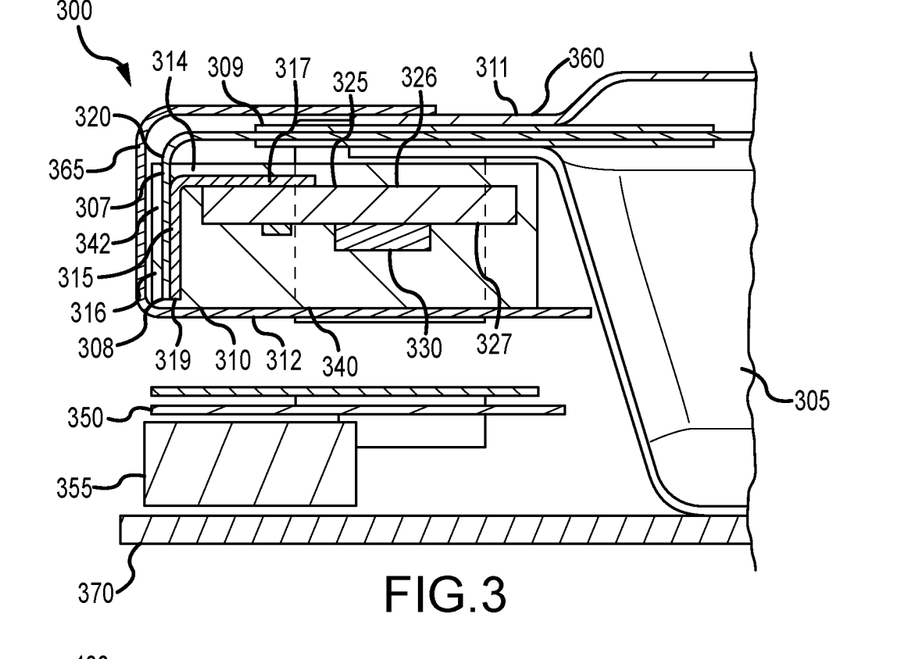
FIG. 3 shows a schematic cross-sectional view of a battery system according to some embodiments of the present technology.

FIG. 3 shows a schematic cross-sectional view of a battery system 300 according to embodiments of the present technology. Battery system 300 may include any of the components previously described, and may include a battery cell 305, and a module 310. Battery cell 305 may include a battery cell as previously described in FIG. 1, and may include one or more cells included within a pouch or packaging. Module 310 may monitor and manage aspects of battery cell 305 operation, and may be a power control module in embodiments.

Battery cell 305 may include one or more terminals or electrode tabs 307 extending from battery cell 305 and providing electrical access to the battery cell. The electrode tab 307 or tabs may extend from an edge of a first side or front side of the battery cell 305. A sealant 309 may be formed or disposed about electrode tab 307 where it penetrates battery cell 305, or the housing of the battery cell. For example, housing 311 may be an outer pouch composed of a flexible material or may be a rigid or semi-rigid enclosure in which battery cell 305 may be maintained. Electrode tab 307 may extend from an edge or side of battery cell 305, and may extend through housing 311. Sealant 309 may extend completely about the housing, or may be maintained substantially about regions where the electrode tab 307 may extend from the housing 311. For example, in some embodiments the housing may be a polymeric pouch that may be sealed or bonded with itself about battery cell 305.

Module 310 may be electrically coupled with battery cell 305 through electrode tab 307. The module 310 may be characterized by a first surface 312 and a second surface 314 opposite the first surface. Module 310 also may be characterized by a height between the first surface 312 and the second surface 314. Coupled along or proximate first surface 312 may be a conductive tab 315. Conductive tab 315 may be electrically coupled with electrode tab 307 to access and monitor battery cell 305. Conductive tab 315 may extend from a first side or front side of the module 310, and may be partially or substantially parallel to electrode tab 307 as exiting the module 310.

Conductive tab 315 may be coupled to module 310 at a first end 317 of conductive tab 315. The coupling may be by a weld, conductive adhesive, or other conductive coupling allowing or facilitating electrical transfer between conductive tab 315 and module 310. Conductive tab 315 may extend from first end 317 along a length of the conductive tab to a second or distal end 319. From first end 317, conductive tab 315 may extend relatively or substantially parallel to a plane of the electrode tab 307. Second end 319 may be fixedly coupled with electrode tab 307 along a distal region of conductive tab 315 with a distal portion of electrode tab 307, such as a distal portion 308. Conductive tab 315 and electrode tab 307 may also be coupled via weld, adhesive, or any other coupling allowing electrical communication between the components.

In some embodiments, one or both of electrode tab 307 and conductive tab 315 may be characterized by a curvature or fold of the tab that may extend at least partially along a length of the tabs. The fold 320 may allow a distal region of conductive tab 315, such as second end 319, as well as a distal region of electrode tab 307, such as distal portion 308, to extend partially or substantially vertically along module 310. Additional embodiments of the curvatures and couplings of the electrode tabs are discussed further below. Electrode tab 307 may be a more robust component than conductive tab 315 in some embodiments. For example, electrode tab 307 may be thicker than conductive tab 315, and may provide additional support and protection to battery module 310. Battery system 300 may be used in any number of devices, including mobile devices that may be dropped, bumped, or otherwise jostled, which may affect interior components. As devices shrink, spacing within a device may also reduce, which may place multiple components in close proximity within the device. These components, which may include circuit boards, circuit components, circuit couplings, and other materials, may include sharp corners, or other features that may damage other components in close proximity. Battery module 310 may be a relatively fragile component, or may include fragile components within the structure. The coupling of battery cell 305 and module 310 may be performed to provide additional protection of the module and included components.

Module 310 may include a number of components in embodiments of the present technology. Module 310 may include a circuit board 325, which may include one or more components 330 extending from a surface of circuit board 325. Circuit board 325 may include a first surface 326 proximate or adjacent electrode tab 307, and a second surface 327 opposite the first surface 326. In some embodiments, components 330 may extend from second surface 327 of circuit board 325, and may extend away from electrode tab 307. Module 310 may include materials to protect components 330 from device abuse and potential fluid ingress by including them within a cavity included within module 310. Such a cavity optionally may be filled with a pottant configured to encapsulate components 330. Module 310 may include a mold 340 that at least partially encapsulates the circuit board 325. Mold 340 may be made from a number of materials including foams, plastics, rubbers, and other insulating materials. As illustrated, mold 340 may define a recess 342 along a first side of the module 310, such as along an external sidewall 316. This recess may allow at least a portion of one or both of the electrode tab 307 and the conductive tab 315 to be positioned within mold 340.

For example, as illustrated, a distal portion of each of conductive tab 315 and electrode tab 307 is recessed back within the mold 340 proximate where the tabs are coupled. This design may also utilize the curvature of the tabs to provide additional protection to the conductive tab 315 as described above. In some embodiments electrode tab 307 may extend about module 310 on one or more sides. In addition to the electrode tab extending along the front face of the module, for example, module 310 also may be at least partially seated on electrode tab 307, where the electrode tab extends from housing 311. Battery system 300 may form a terrace 360 extending laterally from the battery cell and supporting module 310. Terrace 360 may be a bracket or other support structure that supports electrode tab 307 as it extends from battery cell 305, and may be a plastic, or insulative material in embodiments. In some embodiments, such as illustrated, terrace 360 may be formed from electrode tab 307 and housing 311 allowing module 310 to at least partially reside on the formed terrace along the first side of the battery cell. Terrace 360 may span the entire length or width of the battery cell 305 to fully support module 310, although module 310 may be characterized by an overhang as will be discussed further below. As electrode tab 307, as well as a second electrode tab not shown in this view, may only extend from a portion of battery cell 305, other regions of the terrace may be substantially or fully formed by the housing 311.

Battery system 300 may additionally include a flexible coupling 350 allowing battery cell 305, via module 310, to be connected to a system board, such as a system-in-package ("SIP") board 370. Flexible coupling 350 may extend from circuit board 325 as will be described further below, and may include a curvature to extend the flexible coupling back along the module 310. Battery cell 305 may also be seated on SIP board 370. SIP board 370 may extend laterally beyond an edge of battery cell 305, and with electrode tab 307 extending from battery cell 305, may define a height of a volume within which the module 310 may be positioned. Flexible coupling 350 may also be positioned within this volume and may allow the battery system to be connected with the SIP board 370 via a board-to-board connector 355, or other connector, communicatively coupling the flexible coupling with the SIP board 370. Flexible coupling 350, along with particular configurations and benefits, will be described further below.

To protect each of the conductive components, battery system 300 may include one or more layers of additional environmental protection. Battery system 300 may include an environmental protective tape, such as a first insulative tape 365 extending about module 310, and at least partially covering first surface 312, second surface 314, and external sidewall 316. While in some embodiments the tape is water resistant, in other embodiments the tape may be configured to simply protect the components from any environmental contaminants including dust, lint, or other particulates, and insulate the components against contact. The first insulative tape 365 may be or include a polymer backing with an applied adhesive. The polymer may be any number of polymers that provide electrical resistivity, structural resiliency, hydrophobicity, and flexibility. For example, in some embodiments a polyimide-backed tape may be used, which may afford a thin film tape that may be flexible to accommodate the topography of module 310, while limiting gaps or spacing about the module. First insulative tape 365 may extend along an exterior surface of terrace 360, and may at least partially cover a backside of electrode tab 307 where the electrode tab extends within recess 342 of mold 340. Tape 365 may be extended to cover first surface 312 of module 310, and may continue to contact or extend along the first surface of battery cell 305. Although described as a tape, additional adhesives, encapsulants, and enclosures may be utilized to provide a similar protection to components of the module 310, and are similarly encompassed by the present technology.

Figure 4:
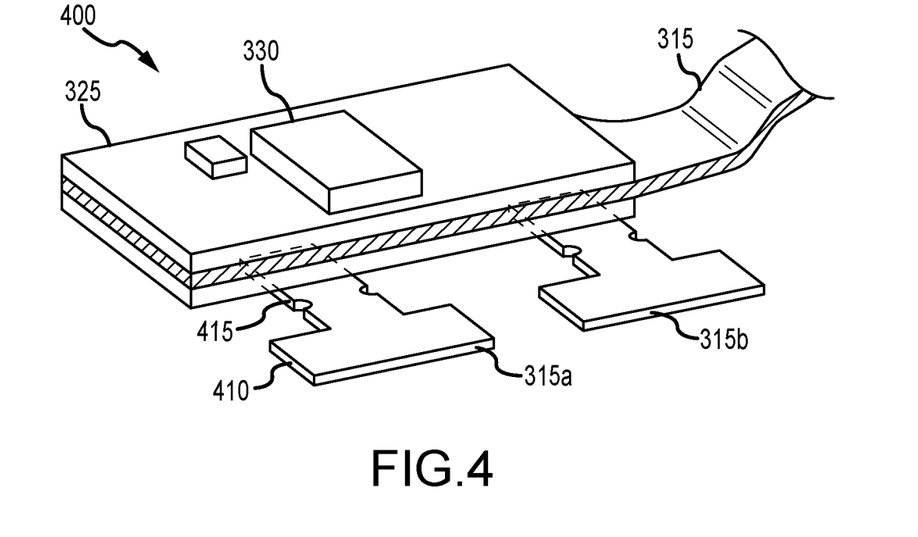
FIG. 4 shows a schematic perspective view of a control board according to some embodiments of the present technology.

Turning to FIG. 4 is shown a schematic perspective view of a control board 400 according to embodiments of the present technology. Board 400 may include some or all of the characteristics discussed for circuit board 325 described above, and may be incorporated within battery system 300. Along with some of the following figures, FIG. 4 may illustrate some aspects involved in the formation of a battery system according to some embodiments of the present technology.

As illustrated, control board 400 may include components of module 310. Control board 400 may include a circuit board 325, which may be or include a multi-layer material. One or more components 330 may extend from a surface of the circuit board 325, as shown in the figure for illustrative purposes. Circuit board 325 may also include one or more couplings, including first couplings allowing connectivity with a battery cell, as well as second couplings allowing connectivity with a system board. Circuit board 325 may include one, two, or more conductive tabs 315 configured to couple circuit board 325 with a battery cell, such as battery cell 305 previously described. Conductive tabs 315 may extend from a first side of the circuit board as shown, and may be formed from any of the conductive materials previously identified. Although circuit board 325 may include any number of conductive tabs, the board may include two as illustrated, and conductive tabs 315a, 315b may be configured to connect with electrode tabs, such as an anode tab and a cathode tab of a battery cell. Conductive tabs 315 may extend laterally from a surface of the circuit board opposite a surface from which the components 330 may extend.

Additionally, flexible coupling 350 may extend from a second side of the circuit board 325, and may extend from a second side adjacent the first side from which conductive tabs 315 may extend. In some embodiments, the second side is orthogonal to the first side, although in embodiments based on circuit board configurations, the two sides may not be exactly perpendicular. More generally, when components or aspects of the present disclosure are identified as being orthogonal or perpendicular, it is to be understood that this term is to encompass tolerances of a few up to several degrees above or below a right angle between the components or aspects.

Conductive tabs 315 may include a variety of geometries providing a surface for coupling with electrode tabs of a battery cell. Although conductive tabs 315 may be rectangular, in some embodiments conductive tabs 315 may be characterized by a butterfly shape to facilitate folding back across the surface of the module as will be further described below. Conductive tabs 315 may include a weld tab 410, which may provide a landing space and surface to which electrode tabs may be welded, bonded, or otherwise adhered. Conductive tabs 315 may also include an extension portion 415 connecting the weld tab 410 to a portion coupled with the circuit board 325. Extension portion 415 may include one or more notches, regions, thicknesses, or widths along a length of the extension portion. Extension portion 415 may be shaped or configured to facilitate bending, folding, or manipulation of conductive tab 315 to improve a contact surface position for the weld tab 410, as well as to limit sheering or other forces on the conductive tab. For example, although circuit board 325 and associated components may be of any size for any particular device, circuit board 325 may be configured to accommodate small devices including glasses, watches, or other wearable technology. In some of these sizes, conductive tabs 315 may be characterized by dimensions of a few millimeters or less, and thus forces that may damage the tabs may be relatively low. Thus, extension portion 415 may be sized or shaped to accommodate the forces associated with manipulating material in this size range.

Figure 5:
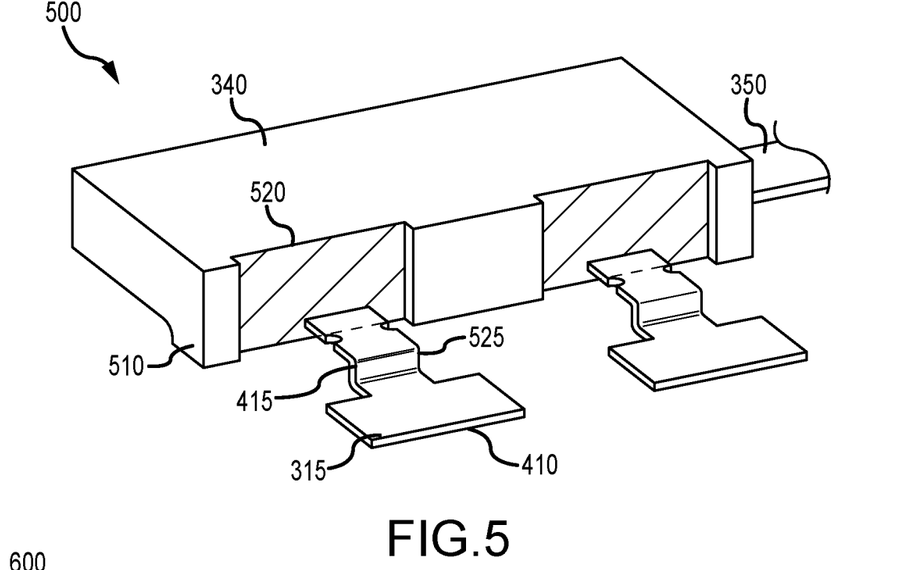
FIG. 5 shows a schematic perspective view of a module according to some embodiments of the present technology.

FIG. 5 shows a schematic perspective view of a module 500 according to some embodiments of the present technology. Module 500 may be or include any aspect of module 310 previously described, and may illustrate control board 400 subsequent placement or formation of a mold 340 on the circuit board. As previously explained, mold 340 may at least partially encapsulate circuit board 325 of FIG. 4. Mold 340 may include two or more portions that couple about circuit board 325, or mold 340 may be formed continuously about circuit board 325 in some embodiments. Mold 340 may include gaps or apertures through which flexible coupling 350 and conductive tabs 315 may penetrate mold 340. The shape of mold 340 may be configured to allow module 500 to at least partially seat on a terrace of a battery cell as previously described. Accordingly, mold 340 may be characterized by a shape including a portion 510 of the mold 340 configured to extend beyond the terrace. Thus, portion 510 may be characterized by a height greater than a height of the mold seated on the terrace. Mold 340 may also define one or more recesses across a surface of mold 340. As illustrated, a first or front surface of mold 340 may define a recess 520 at a position through which each conductive tab 315 penetrates the mold. Recesses 520 may be characterized by a depth into the mold 340 corresponding to a thickness of conductive tab 315 and an electrode tab to which conductive tab 315 may be coupled. The width of recesses 520 may correspond to the width of weld tab 410 of conductive tab 315, which as previously described may be greater than a width of an electrode tab with which the conductive tab 315 may be coupled.

Because mold 340 may include portions extending above and below the circuit board from which the conductive tabs 315 extend, the conductive tabs 315 may extend from the mold vertically offset from the electrode tab extending below the mold as previously described. Accordingly, during manufacturing, an L-bend 525 may be formed in extension 415 on each conductive tab. The L-bend 525 may be characterized by an angle of bend, which may be termed a decreasing angle of bend in that L-bend 525 may lower weld tab 410 of conductive extension 315 as illustrated. L-bend 525 may be characterized by an angle of from about 0° to about 100°, lowering the weld tab below a lower surface of the encapsulated circuit board. The angle of L-bend 525 may be up to or within any angle of the noted range, and may depend on the distance of travel to reduce the height of weld tab 410. The illustrated bend may correspond to an S-bend or other double bend during manufacturing in order to maintain weld tab 410 parallel to a plane of both a surface of the circuit board as well as a plane of a coupling surface of an associated electrode tab, such as a distal portion of an electrode tab. Accordingly, the illustrated bend may more appropriately correspond to an S-bend prior to final formation of the battery system. However, as additional formation with the weld tab 410 may occur, the extent of the bend forming the lower portion of the S-bend may be continued into a U-bend after coupling as will be further described below.

Figure 6:
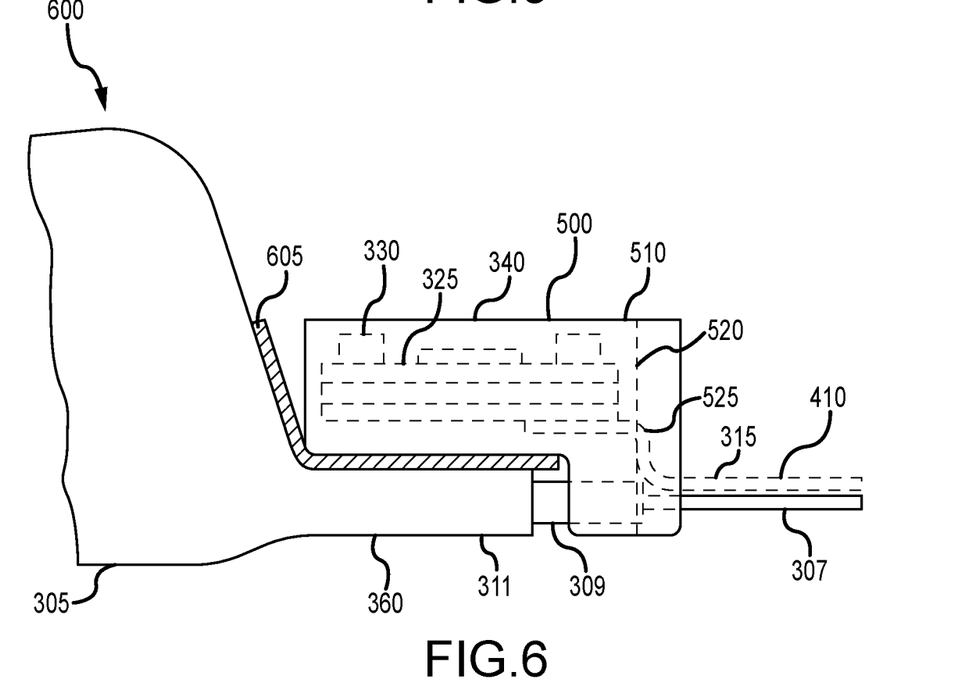
FIG. 6 shows a schematic side elevation view of a battery system according to some embodiments of the present technology.

FIG. 6 illustrates a schematic side elevation view of a battery system 600 according to some embodiments of the present technology. FIG. 6 may illustrate module 500 during coupling with a battery cell 305 according to embodiments of the present technology. Module 500 illustrates circuit board 325 in hidden view as encapsulated within mold 340, and illustrates components 330 extending from circuit board 325 in a direction away from electrode tab 307 of battery cell 305. As previously described, battery cell 305 may form a terrace 360, which may include portions of the battery cell housing and electrode tab 307. Battery system 600 also illustrates an amount of sealant 309 disposed about electrode tab 307 where the tab penetrates battery cell housing 311. Module 500 may be seated at least partially on terrace 360, and as illustrated may be seated on a terrace insulator 605, which may provide insulation and stability for module 500.

Module 500 may be at least partially adhered to terrace 360 along a lower surface of mold 340. For example, terrace insulator 605 may be included along a surface of terrace 360, and module 500 may contact terrace insulator 605 along a portion of mold 340 extending over terrace 360. Terrace insulator 605 may include adhesive on one or two surfaces, to couple with battery cell 305, or battery cell housing 311, and optionally couple with module 500, or mold 340, as well in some embodiments. Terrace insulator 605 may include an amount of cushion or thickness to afford compression or flexibility for movement and protection of module 500.

For example, electrode tabs 307 may only include extensions in a few locations across the terrace, which may produce an irregular surface topography, or a non-planar surface. By including terrace insulator 605, a material may be included that adheres entirely across module 500 and may include no gaps with either terrace 360 or module 500. Thus, along portions external from the electrode tab 307 or tabs, which may only extend partially along a length of battery cell 305, terrace 360 may include terrace insulator 605 between the terrace 360 and battery module 500. Terrace insulator 605 may include an increased thickness as previously discussed to accommodate the varying thickness along terrace 360 due to the inclusion of electrode tabs 307 over partial sections of the terrace, while maintaining contact with module 500 along an entire length of the module.

Battery system 600 also illustrates portion 510 of battery module 500 that extends beyond terrace 360, and may extend beyond a height of the portion of module 500 that is seated on terrace 360. Recess 520 is also shown in hidden view illustrating where conductive tab 315 may extend through mold 340. L-bend 525 is shown where it occurs proximate or within recess 520 effectively lowering a vertical position of weld tab 410 to a plane in communication with a distal end of electrode tab 307. As explained, in this operation of manufacturing, L-bend 525 may appear or be formed as an S-bend to provide weld tab 410 in a parallel plane allowing coupling to occur. By utilizing module 500 or other modules according to the present technology, a direct placement of module 500 may be performed with respect to battery cell 305, which may reduce the number and complexity of manufacturing operations.

Figure 7:
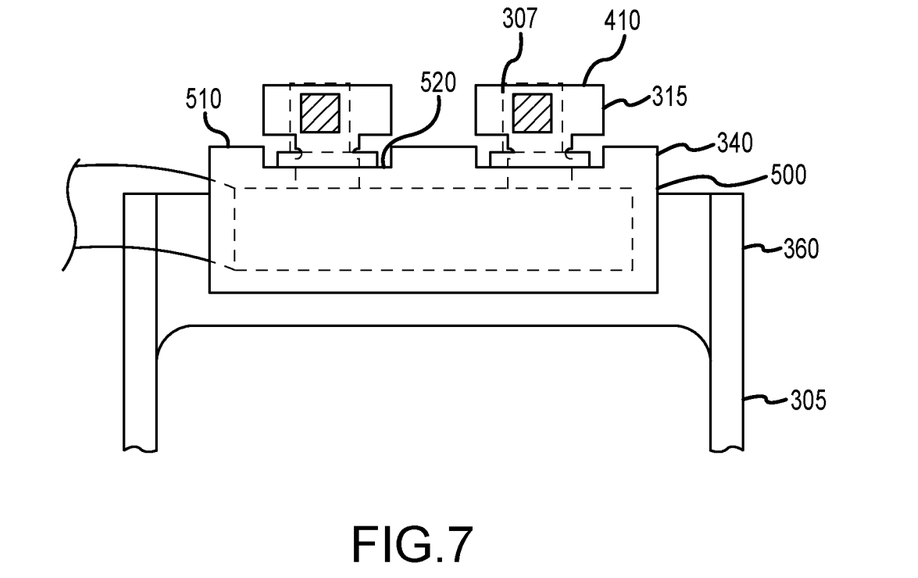
FIG. 7 shows a schematic plan view of a battery system according to some embodiments of the present technology.

FIG. 7 shows a schematic plan view of battery system 600 according to some embodiments of the present technology, which may further illustrate the direct placement process for coupling module 500 with battery cell 305. Module 500 may be seated on terrace 360 to provide a portion of module 500 on terrace 360, and a portion 510 extending beyond the terrace 360. As previously shown, portion 510 may extend within a plane of terrace 360 to be laterally positioned about electrode tabs 307 as well conductive tabs 315. As illustrated, and previously shown, mold 340 may provide lateral coverage about electrode tab 307 where electrode tab 307 exits battery cell 305.

Recesses 520 may be defined at a position where conductive tab 315 penetrates mold 340, and recesses 520 may also align with a location of electrode tabs 307 when module 500 may be placed on terrace 360. Because of manufacturing variation with both battery cell formation as well as direct placement location, electrode tabs 307 and conductive tabs 315 may have positional variation from system to system. However, as illustrated in FIG. 7, weld tab 410 of conductive tab 315 may extend laterally to or be characterized by a width greater than a corresponding width of electrode tab 307. Accordingly, despite lateral offset between the components, weld tab 410 may be configured to account for a distance of offset greater than or about 10% from center in either lateral direction. In some embodiments, weld tab 410 may be configured to account for a lateral offset from center of greater than or about 20%, greater than or about 30%, greater than or about 40%, greater than or about 50%, or more, such that in some embodiments, although electrode tab 307 and conductive tab 315 may be configured to have corresponding center lines, in embodiments, electrode tab 307 may be offset up to either lateral edge, and still fully covered by weld tab 410, which may allow full coupling of the components via weld, adhesive, bonding, or other coupling.

Figure 8:
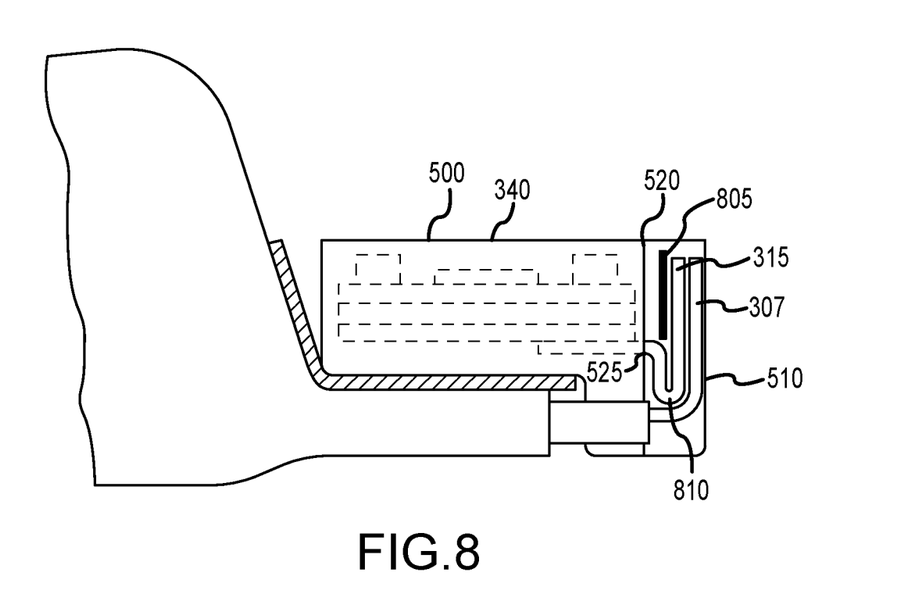
FIG. 8 shows a schematic side elevation view of a battery system according to some embodiments of the present technology.

FIG. 8 shows a schematic side elevation view of battery system 600 according to some embodiments of the present technology. Subsequent coupling of electrode tab 307 and conductive tab 315, the two components may be further folded back into recess 520 formed in mold 340. The bend or fold may be performed to bring a distal portion of each of electrode tab 307 and conductive tab 315 within recess 520 of mold 340. In some embodiments, the fold may be performed to fully recess the tabs within recess 520 so no portion of the tabs may extend beyond first portion 510 of module 500. However, as will be explained below, additional embodiments may form the bend further out on the tabs, and a portion of one or both tabs, such as proximate the bend or curvature, may extend beyond the mold 340.

An optional adhesive 805 may be included on the mold within the recess 520 to further couple conductive tab 315 within the module 500. The adhesive may be any type of adhesive configured to couple multiple materials, and may be a double-sided tape, a glue or other bonding agent, for example. The bending may provide an amount of curvature of electrode tab 307 forming an arcuate shape. The bending may also be performed to provide a U-bend 810 distal to the L-bend 525 on the conductive tab 315. As previously explained, the S-bend that may occur during manufacturing to provide the weld tab parallel with the electrode tab may be continued at the second bend to form the U-structure. Accordingly, when the battery system is complete, the profile of the conductive tab may include both L-bend 525 as well as U-bend 810 bringing a distal end of the conductive tab within the recess 520. In some embodiments, such as in the illustration, the bend, which may provide the curvature of electrode tab 307 as well as the second or double bend of conductive tab 315, may provide a front surface of the module 500 facing away from the battery cell 305 that is characterized by the profile of the mold 340. Thus, in some embodiments the conductive tab 315 and the electrode tab 307 may be fully recessed within or flush with an outer surface of mold 340.

Figure 9:
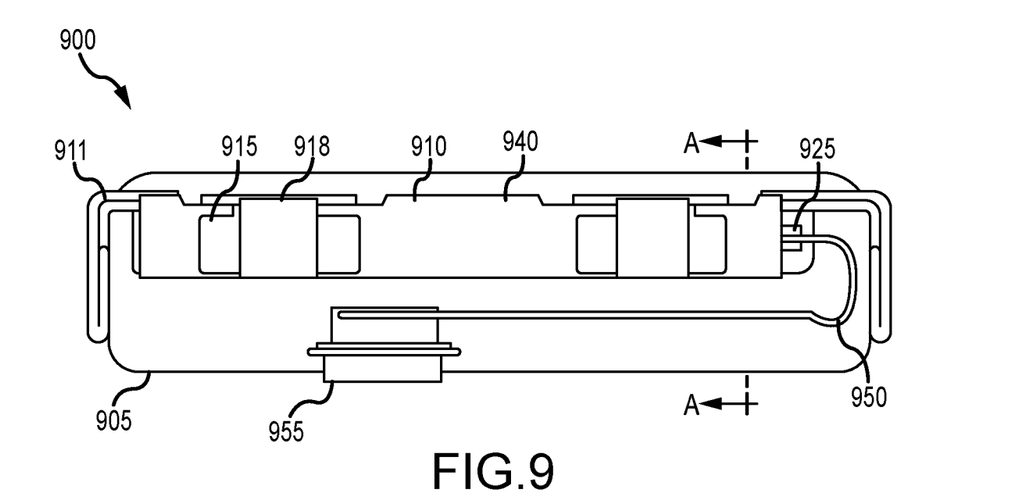
FIG. 9 shows a schematic front elevation view of a battery system according to some embodiments of the present technology.

FIG. 9 shows a schematic front elevation view of a battery system 900 according to some embodiments of the present technology. Battery system 900 may be a view of a completed battery system as illustrated or partially illustrated in any of the previous figures, and may provide an illustration of the flexible coupling as incorporated within the system. For example, battery system 900 may include some or all of the components of battery system 300 described above. Battery system 900 may illustrate a battery system as may be positioned within a device where coupling with a system board may be performed. Accordingly, battery system 900 may be a reversed elevation view of previous designs, where in manufacturing the battery system may be formed inverted.

Battery system 900 may include battery cell 905 as well as a module 910. Battery system 900 may show conductive tabs 915, which may extend laterally outward of electrode tabs previously discussed. Electrode tabs are not visible despite being outside of conductive tabs 915, because battery system 900 includes an additional insulative tape 918 positioned over the electrode tabs. Insulative tape 918 may be similar to first insulative tape 365 previously described, although in some embodiments insulative tape 918 may be different. For example, insulative tape 918 may be included to cover and optionally hold electrode tabs and conductive tabs 915 in place, while an additional first insulative tape as previously described may then be formed across the entire module to provide additional insulation, protection, and a uniform surface profile. Accordingly, insulative tape 918 may be characterized by a reduced thickness compared to a final insulative tape.

As illustrated, mold 940 may not fully encapsulate circuit board 925, although in other embodiments, the mold may fully laterally enclose the circuit board as previously shown. Flexible coupling 950 may extend from an edge or side of circuit board 925 and/or mold 940 adjacent to a side from which conductive tabs 915 may extend from circuit board 925. Flexible coupling 950 may be printed circuit board, flex board, or other circuit materials or cables that may allow electrical transmission as well as communication transmission to and from the individual circuit modules to a system board as previously described. Flexible coupling 950 may extend from circuit board 925 in a first direction, and then be curved with a U-bend proximate the circuit board 925. The flexible coupling may curve or be extended vertically to be run back along or substantially parallel to module 910. The flexible coupling 950 may extend along the mold 940 to a lateral position along a length of the module, such as a midpoint, or some interior lateral position along the module 910. Flexible coupling 950 may extend along the mold to or toward a connector 955 by which the battery system 900 may be connected with a system board as previously described.

As illustrated, this configuration allows the flexible coupling to be maintained within a vertical dimension at least partially defined by battery cell 905. Whereas many conventional designs extend a circuit connection away from a battery cell, the present technology may incorporate the entire module of the system within a volume defined from one position by a terrace of the battery cell 905, and within a height and/or length of the battery cell. Connector 955 may at least partially extend beyond the height of the battery cell in some embodiments depending on the system connection, although in some embodiments, all module components may be maintained within a volume defined at least partially by a height and lateral width of the battery cell 905.

FIG. 9 also shows an additional aspect of battery cell 905 according to some embodiments of the present technology. On a first side of battery cell 905 may be a terrace and electrode tabs as previously described. On adjacent sides of the battery cell 905, battery cell housing 911 may be closed with a single, double, or multiple fold of the housing material. As previously explained, battery cell 905, or any other battery cell previously described, may include a pouch enclosure or other enclosure design. Some battery cells may include a conductive material that extends to the edges of the cell along with the housing material. This conductive material, such as a metal, may provide an access for corrosion or shorting if not protected. Accordingly, a fold or multiple folds may be administered to the housing material to limit or prevent an exterior edge from being exposed.

As shown, housing 911 on each lateral side adjacent a front side from which electrode tabs may extend may include a double fold that recesses an edge of the housing material, and any material positioned between a top and bottom layer of the housing material, within a second fold of the housing material. Thus, a first fold may bring the housing material back across itself towards the battery cell 905. Subsequently, a second fold may be performed to bring the first fold vertically against a sidewall of the battery cell, which may maintain the first fold positioned towards an internal surface of the housing material as shown. Any number of additional internal folds or rolls may also be performed in other embodiments to further limit exposure of a sealing edge of the battery cell housing material. Such folding may be performed on any remaining side of the battery cell separate from the side from which the electrode tabs extend, depending on the geometry of the cell, and may not be limited to the opposite sides of the cell as shown, with each adjacent to the first side from which the electrode tabs extend.

Figure 10:
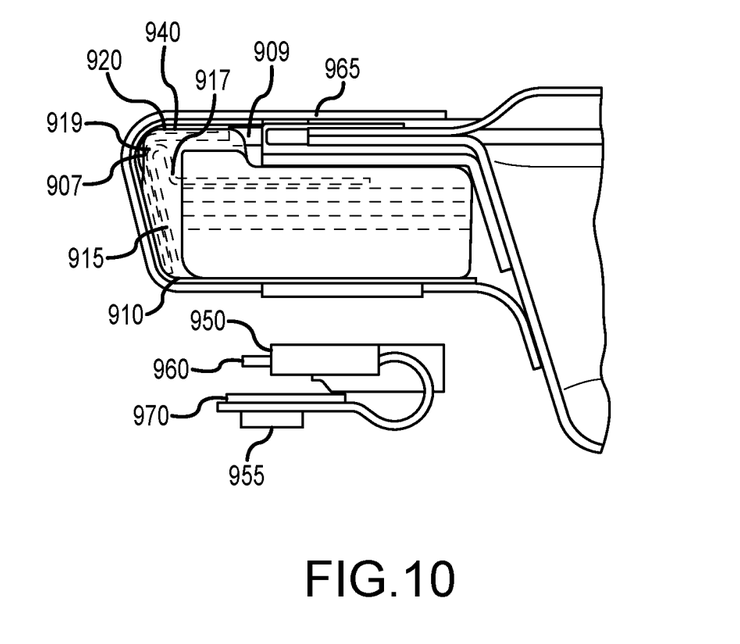
FIG. 10 shows a schematic cross-sectional view along line A-A of FIG. 9 of a battery system according to some embodiments of the present technology.

FIG. 10 shows a schematic cross-sectional view along line A-A of FIG. 9 of a battery system 900 according to some embodiments of the present technology. FIG. 10 illustrates additional features of flexible coupling 950 at a distal end from where flexible coupling may couple with circuit board 925. Additionally, FIG. 10 may show an additional bending of electrode tab 907 and conductive tab 915 from the flush bending described previously.

FIG. 10 illustrates many of the same components previously described, and may include any of the components, configurations, or materials of any of the previous figures. The figure includes mold 940 shown transparently to illustrate how electrode tab 907 and conductive tab 915 may be positioned within recess 920 of mold 940. In some embodiments, such as illustrated, the bend forming the curvature of electrode tab 907 may be performed further out along a length of the electrode tab. L-bend 917 may be formed substantially as previously described, and may be formed to a smaller angle to position the weld tab of conductive tab 915 further along a distal region of electrode tab 907. U-bend 919 may then be formed at a more distal position of conductive tab 915, and may be formed to bring distal portions of both conductive tab 915 and electrode tab 907 back within recess 920 of mold 940. Accordingly, a portion of one or both of electrode tab 907 or conductive tab 915 may extend beyond a front surface of mold 940.

Such a configuration may extend the weld or coupling location of the two tabs to a more distal location of the electrode tab from where it penetrates the battery cell housing. As previously described, sealant 909 may be coated or formed about the electrode tab as it exits the battery cell housing. The amount of sealant flow may be difficult to control in some manufacturing, and sealant may extend along electrode tab 907 a certain distance. By moving the coupling position to a more distal location of the electrode tab as illustrated, the opportunity for sealant to extend to the coupling location and disrupt the coupling operation may be reduced compared to coupling as previously described, which may be capable of recessing both tabs fully within the mold, but may provide a risk of sealant extending to the coupling location. As previously described, a first insulative tape 965 may extend about the module 910 to provide an even front surface, as well as protection for the module.

Additionally shown in the figure is an additional embodiment of the flexible coupling described above. The present view is shown laterally internal to the U-bend of the flexible coupling, but illustrates flexible coupling 950 proximate connector 955. In some embodiments as shown, flexible coupling 950 may be a first flexible coupling. A distal end of first flexible coupling 950 may extend to and be electrically coupled with a second flexible coupling 960. The second flexible coupling 960 may extend partially or substantially perpendicular to the first flexible coupling 950. In some embodiments, second flexible coupling 960 may extend from first flexible coupling 950 back towards the battery cell, which may allow second flexible coupling 960 to be maintained within a volume defined laterally by a length of module 910 as illustrated. Accordingly, the flexible coupling may not extend outward beyond the module in some embodiments. The second flexible coupling 960 may form a U-bend as illustrated proximate the battery cell 905, and may extend back across first flexible coupling 950, such as around the distal end of the first flexible coupling 950. The second flexible coupling 960 may then be electrically coupled with the connector 955 at a distal end of the second flexible coupling 960.

The second flexible coupling 960 may be electrically coupled with the connector 955 along a first surface of the second flexible coupling to provide the connector facing towards a SIP board as previously described, allowing the system connections for the battery system. To provide additional stability and support for the connector, a suspension bracket 970 may be coupled with the second flexible coupling 960 on a backside of the second flexible coupling, or on a second surface of the second flexible coupling 960 opposite the first surface of the second flexible coupling. By utilizing components and configurations according to the present technology, an improved system profile may be provided in which a battery control module may be maintained laterally adjacent a battery cell, and fully confined within dimensions of the battery cell, such as a height and length of the cell. This may increase space for additional device components, or ease internal device configurations, by providing a volume characterized by a profile similar to or confined within a hyperrectangle, compared to being two laterally separated spaces for the battery cell and control connections typical of some conventional devices.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery system comprising:
a battery cell, wherein the battery cell includes an electrode tab extending from an edge of a first side of the battery cell; and
a module electrically coupled with the battery cell, the module comprising:
a mold defining a recess along a first side of the module,
a conductive tab extending from the first side of the module, wherein the conductive tab is electrically coupled with the electrode tab, wherein the electrode tab is characterized by a curvature along a length of the electrode tab, and wherein a distal end of the electrode tab is positioned within the recess defined by the mold, and
a flexible coupling extending from a second side of the module adjacent to the first side of the module.

2. The battery system of claim 1, wherein the flexible coupling curves vertically and extends back along the module to a lateral position along a length of the module.

3. The battery system of claim 2, further comprising a system board, wherein the flexible coupling is communicatively coupled with the system board by a board-to-board connector.

4. The battery system of claim 3, wherein the battery cell is seated on the system board, wherein a volume is at least partially defined between the electrode tab and the system board, and wherein the module and flexible coupling are maintained within the volume.

5. The battery system of claim 1, wherein the conductive tab is characterized by a double bend that extends a distal portion of the conductive tab parallel with the distal end of the electrode tab.

6. The battery system of claim 1, wherein the battery cell comprises a housing, and wherein opposite sides of the battery cell adjacent the first side of the battery cell are characterized by folded edges.

7. The battery system of claim 6, wherein the electrode tab extends from the housing along the first side, and wherein the electrode tab and housing at least partially forms a terrace on which a portion of the module resides along the first side of the battery cell.

8. The battery system of claim 7, wherein a sealant is included about a portion of the electrode tab extending from the housing.

9. A battery system comprising:
a battery cell characterized by a height, wherein the battery cell includes an electrode tab exiting from an edge of a first side of the battery cell, and wherein the battery cell forms a terrace along the first side of the battery cell; and
a module electrically coupled with the battery cell, the module comprising:
a circuit board including a conductive tab extending from a first side of the circuit board and a flexible coupling extending from a second side of the circuit board orthogonal to the first side of the circuit board, wherein the conductive tab is electrically coupled with the electrode tab, and
a mold at least partially encapsulating the circuit board, wherein the conductive tab penetrates the mold, wherein the mold is at least partially seated on the terrace, wherein the flexible coupling forms a U-bend proximate the circuit board, wherein the flexible coupling extends along the mold to a connector by which the battery system is configured to be connected with a system board, and wherein the module and flexible coupling are maintained within a volume defined by the height of the battery cell.

10. The battery system of claim 9, wherein a portion of the mold extends beyond the terrace, and wherein the portion of the mold extending beyond the terrace is characterized by a height greater than a height of the mold seated on the terrace.

11. The battery system of claim 10, wherein the portion of the mold extending beyond the terrace extends laterally about a portion of the electrode tab exiting from the edge of the first side of the battery cell.

12. The battery system of claim 9, wherein the conductive tab extends from the mold vertically offset from the electrode tab, and wherein the conductive tab is characterized by an L-bend extending towards the electrode tab at an angle less than or about 90°.

13. The battery system of claim 12, wherein the conductive tab is coupled with the electrode tab distal to the L-bend, and wherein the conductive tab is further characterized by a U-bend distal to the L-bend.

14. The battery system of claim 13, wherein the mold defines a recess at a position through which the conductive tab penetrates the mold, and wherein a distal end of the conductive tab and a distal end of the electrode tab are positioned within the recess.

15. The battery system of claim 9, wherein the electrode tab is characterized by a first width, and wherein the conductive tab is characterized by a second width greater than the first width.

16. The battery system of claim 9, further comprising an insulative tape extending about the module from a first surface of the terrace opposite a second surface on which the module resides to a location on the battery cell along the height of the battery cell.

17. The battery system of claim 9, wherein the flexible coupling comprises a first flexible coupling, wherein a distal end of the first flexible coupling is electrically coupled with a second flexible coupling, wherein the second flexible coupling extends orthogonally to the first flexible coupling towards the battery cell, wherein the second flexible coupling forms a U-bend proximate the battery cell and extending around the distal end of the first flexible coupling, and wherein the second flexible coupling is electrically coupled with the connector at a distal end of the second flexible coupling.

18. The battery system of claim 17, wherein the second flexible coupling is electrically coupled with the connector along a first surface of the second flexible coupling, and wherein the battery system further comprises a suspension bracket coupled with the second flexible coupling along a second surface of the second flexible coupling opposite the first surface of the second flexible coupling.

19. A battery system comprising:
a battery cell, wherein the battery cell includes an electrode tab extending from an edge of a first side of the battery cell, and wherein the battery cell forms a terrace along the first side of the battery cell, wherein the terrace comprises the electrode tab and a housing of the battery cell; and
a module electrically coupled with the battery cell, the module comprising:
a circuit board including components extending from a first surface of the circuit board, wherein the circuit board is at least partially seated on the terrace along a second surface of the circuit board opposite the first surface, a mold at least partially encapsulating the circuit board, wherein the mold defines a recess along a first side of the module, a conductive tab extending from the first side of the module, wherein the conductive tab is coupled with the electrode tab, wherein the electrode tab is characterized by a curvature along a length of the electrode tab, and wherein a distal end of the electrode tab is positioned within the recess defined by the mold, and a flexible coupling extending from a second side of the module adjacent to the first side of the module.

\* \* \* \* \*